United States Patent [19]

Fukushima et al.

[11] Patent Number: 5,317,404
[45] Date of Patent: May 31, 1994

[54] APPARATUS FOR RECORDING AN IMAGE ON A PHOTOGRAPH IN A STILL-VIDEO CAMERA

[75] Inventors: Nobuo Fukushima; Osamu Takeda, both of Yokohama; Ryoji Kubo, Tokyo, all of Japan

[73] Assignee: Canon Kabushiki Kaisha, Tokyo, Japan

[21] Appl. No.: 767,397

[22] Filed: Sep. 30, 1991

[30] Foreign Application Priority Data

| Oct. 2, 1990 | [JP] | Japan | 2-265355 |
| Oct. 2, 1990 | [JP] | Japan | 2-265356 |
| Oct. 2, 1990 | [JP] | Japan | 2-265357 |
| Oct. 2, 1990 | [JP] | Japan | 2-265362 |

[51] Int. Cl.⁵ .................... H04N 5/30; H04N 5/253
[52] U.S. Cl. ........................................ 358/335; 348/64
[58] Field of Search ............. 358/909, 906, 209, 229, 358/335

[56] References Cited

U.S. PATENT DOCUMENTS

| 4,054,918 | 10/1977 | Kamogawa et al. | 358/214 |
| 4,450,487 | 5/1984 | Koide | 358/209 |
| 4,458,270 | 7/1984 | Kuno et al. | 358/229 |
| 4,786,971 | 11/1988 | Kaneko et al. | 358/909 |
| 5,067,020 | 11/1991 | Funston | 358/214 |
| 5,084,775 | 1/1992 | Kodama et al. | 358/906 |
| 5,111,299 | 5/1992 | Aoki et al. | 358/209 |

FOREIGN PATENT DOCUMENTS

1535723  12/1978  United Kingdom .

Primary Examiner—Joseph Mancuso
Assistant Examiner—Wendy R. Greening
Attorney, Agent, or Firm—Fitzpatrick, Cella, Harper & Scinto

[57] ABSTRACT

A film adaptor, to be used in combination with a still video camera, for recording an image from a conventional photographic film using the still video camera. The film adaptor has a recording button and an erasing button. By depressing the recording button, the image on the film is recorded by the still video camera and is reproduced immediately thereafter, for confirmation of the recorded image. If the image is considered unnecessary, the erasing button is depressed while the recording button remains depressed, whereupon the recorded image is erased. The film image recording operation is therefore conducted in a simple manner.

22 Claims, 7 Drawing Sheets

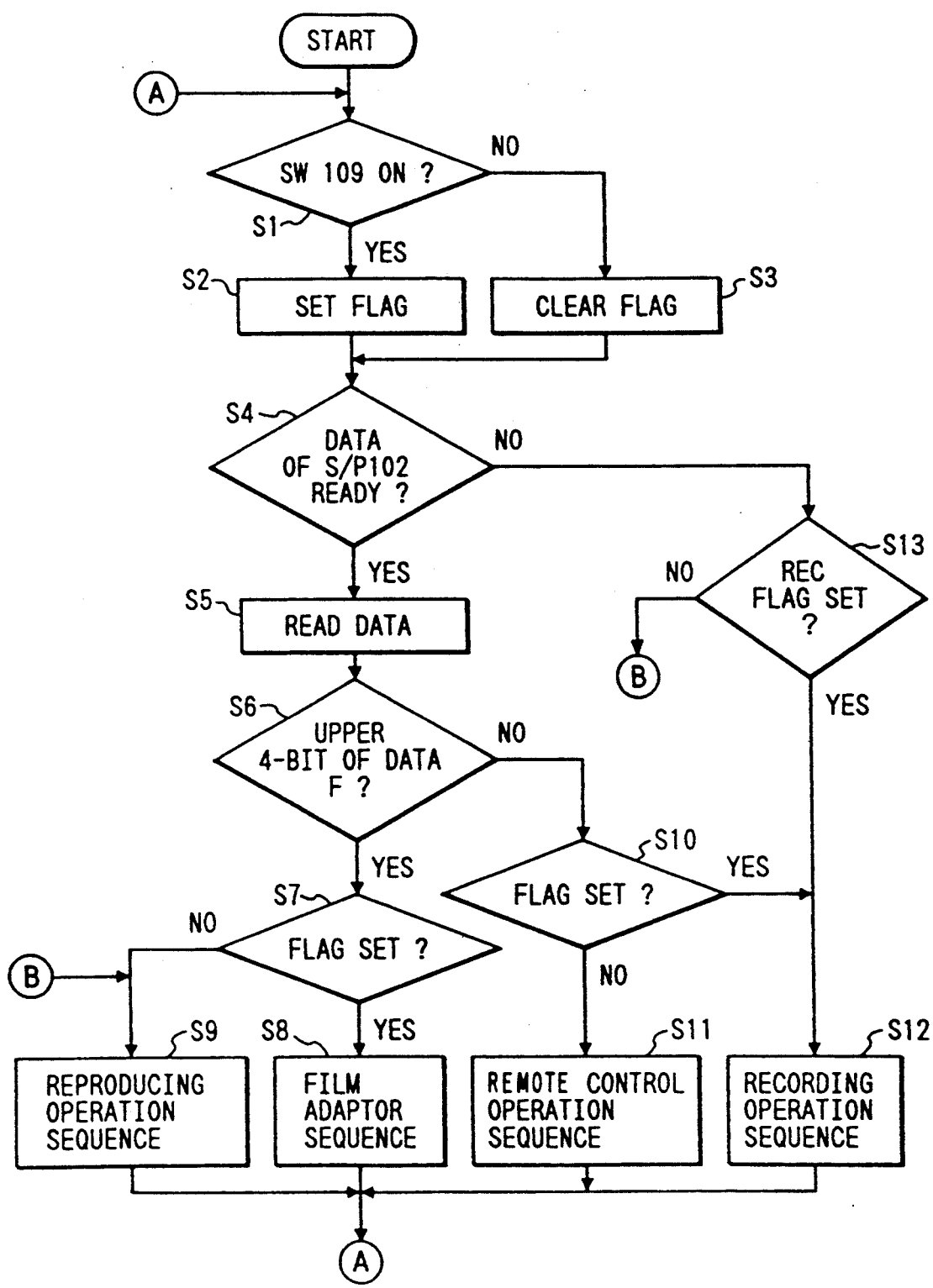

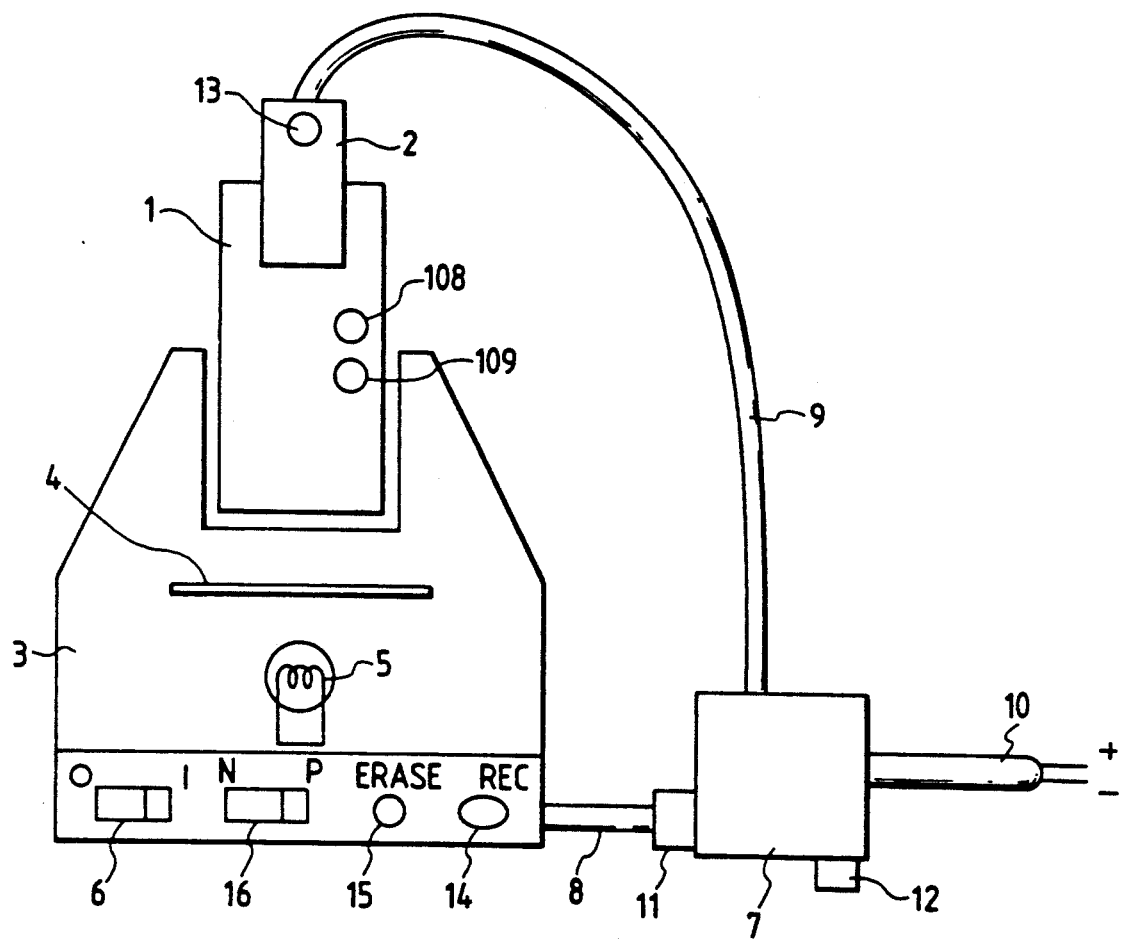

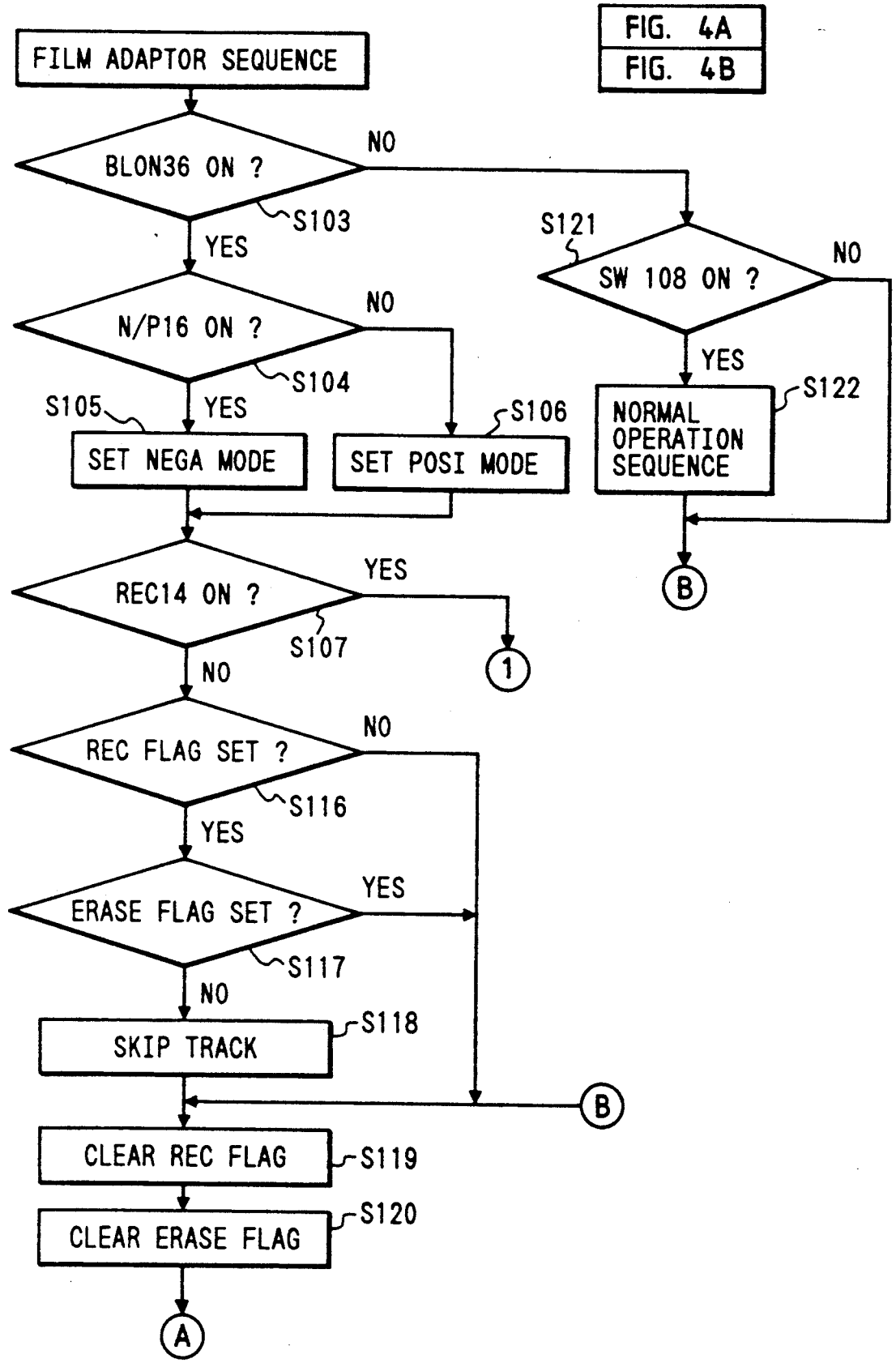

APPARATUS FOR RECORDING AN IMAGE ON A PHOTOGRAPH IN A STILL-VIDEO CAMERA

BACKGROUND OF THE INVENTION

1. Field of the Invention

The present invention relates to an image recording system and an apparatus constituting said system.

2. Related Background Art

There is already proposed an image recording apparatus employing a recording auxiliary adaptor provided for example with an auxiliary optical system and a recording operation unit.

However, if said apparatus is provided not only with the recording function but also the reproducing function, there may be inconveniences such as an erasure of the recorded image during reproduction or overlapped recording, for example if a recording instruction is erroneously given by the auxiliary adaptor while the recorded image is reproduced in the record/reproducing apparatus.

Also, as one of such auxiliary adaptors, there is already known a so-called film adaptor, which is attachable to a camera body, for recording an image previously recorded on a film.

In such a film adaptor, however, the camera body is positioned downwards so that the buttons for the recording operation become difficult to manipulate. Also, the camera may be erroneously used in the film image recording mode (negative/positive inversion mode) when it is not mounted on the film adaptor.

The film image recording in such a system is conducted by setting the camera body in the film image recording mode using a mode selector button on the camera body, then turning on the power source for illumination of the film adaptor, and turning on a recording trigger button of the camera body.

However, the recording of film image often involves erroneous recording operations, such as erroneous inversion of the film, erroneous selection of the image on the film, or an aberration in the film position.

In the case of such an erroneous image recording, it is rather tedious to erase only the unnecessary images by setting the camera in the erasure mode, and there may result erroneous erasures.

Also, these operations are complicated, so that there may be errors in operations such as an image recording operation without illumination in the film adaptor, or without setting the camera in the film image recording mode.

SUMMARY OF THE INVENTION

An object of the present invention is to provide an image recording system and an auxiliary adaptor, capable of collectively or individually resolving the above-mentioned drawbacks.

Another object of the present invention is to provide an image recording system and an auxiliary adaptor with reduced probability of erroneous operations.

Still another object of the present invention is to provide an image recording system and an auxiliary adaptor, capable of preventing erroneous erasure of images which are not to be erased.

The foregoing objects can be attained, according to a preferred embodiment of the present invention, by an auxiliary adaptor which is provided with a recording button and an erasing button, and which enables erasure of the unnecessary images only, without error, by depression of said erasing button, while the recording button is turned on at the recording operation.

Also according to said embodiment, there is disclosed an auxiliary adaptor in which a switch for selecting the film image recording mode also serves as the illumination switch for the film adaptor, thereby enabling the film image recording operation without error.

Still other objects of the present invention, and the advantages thereof, will become fully apparent from the following description of embodiments, to be taken in conjunction with the attached drawings.

BRIEF DESCRIPTION OF THE DRAWINGS

FIG. 2 is a flow chart of the operation sequence of a first embodiment of the present invention;

FIG. 3 is a schematic external view of the embodiment shown in FIG. 1;

FIGS. 4, 4a, 4b are a flow chart showing the details of a step S8 in FIG. 2;

DETAILED DESCRIPTION OF THE PREFERRED EMBODIMENTS

First Embodiment

Now the present invention will be clarified in detail by an embodiment thereof shown in the attached drawings.

Figure 1:
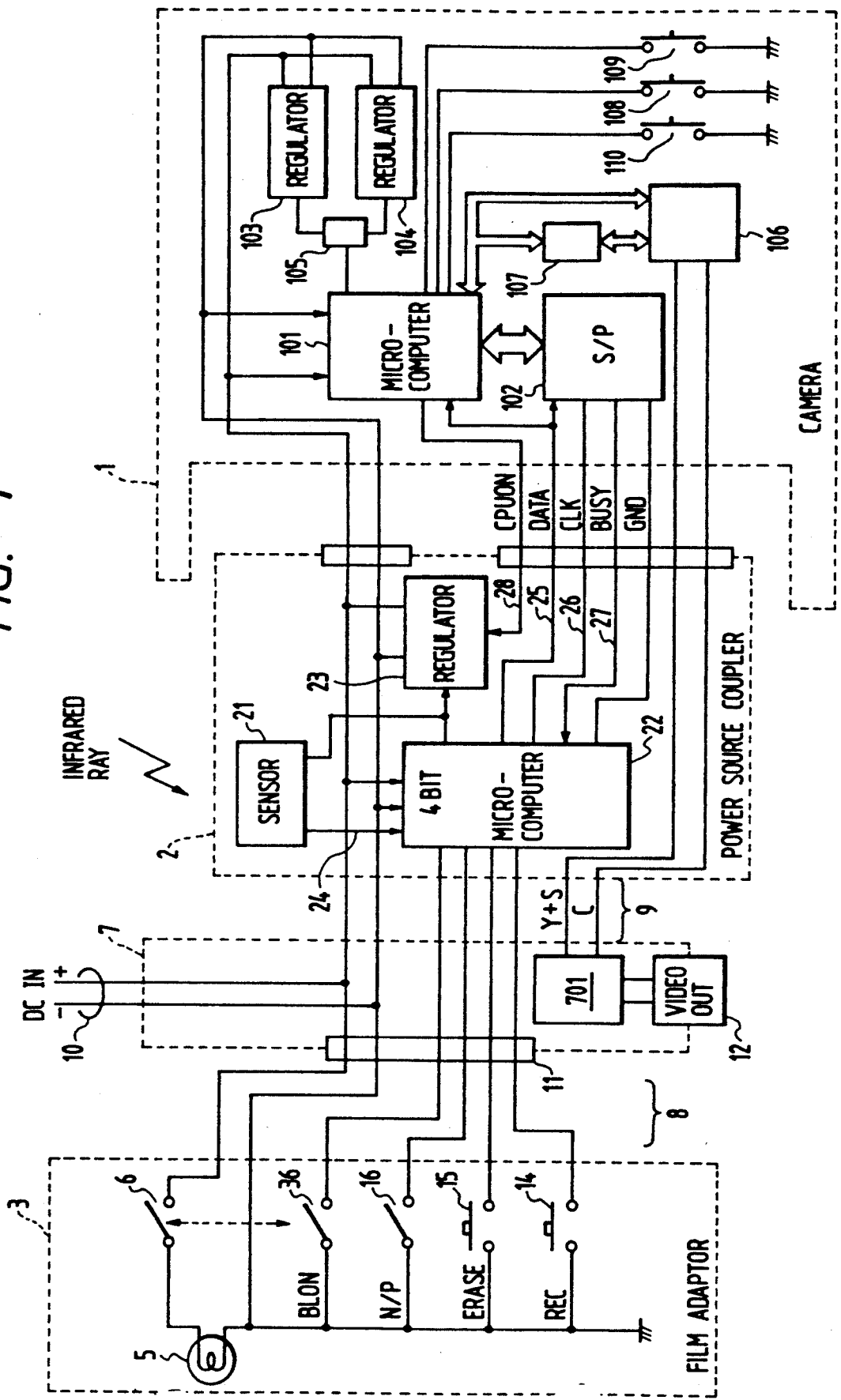
FIG. 1 is a block diagram of an embodiment of the present invention.

FIG. 1 is a block diagram of a control system of a camera body, a film adaptor and connectors therefor, constituting an image recording system embodying the present invention.

FIG. 3 schematically illustrates the external view of said camera body and film adaptor.

The embodiment shown in FIG. 3 is a so-called still video (SV) camera provided with a wireless remote control function and a film image recording function. Said film image recording function is for recording a positive or negative image, recorded on a silver halide-based film by a conventional camera, by said still video camera in the state of said positive image or after conversion into such a positive image.

In the drawings there are shown a camera body 1 and a power supply coupler 2, illustrated in a state mounted on the camera body 1. Said power supply coupler can be detachably mounted, in place of a battery, on a battery mounting portion of the camera body. There are also shown a film adaptor 3; a film 4 positioned therein; an illumination source 5; a lamp switch 6; a recording switch 14; an erasing switch 15; a negative-positive changeover switch 16; and an interface adaptor 7 for connecting cables 8–10.

A cable 8, connecting the film adaptor with the interface adaptor, contains lines connected to the switches of the film adaptor, power supply lines etc.

A cable 9, connecting the power supply coupler with the interface adaptor, contains image signal lines etc. in addition to those of the cable 8.

There are further shown a DC power supply line 10 connected to an unrepresented AC-DC adaptor; a connector 11 for detaching the cable 8 from the interface adaptor 7; a video output terminal (S-image output terminal etc.) 12; and a light receiving window 13; provided on the power supply coupler, for receiving an infrared signal from an unrepresented wireless remote control unit.

In case of film image recording, the camera body 1 is mounted on the film adaptor 3 as shown in FIG. 3, then the film 4 is set, and the illumination lamp 5 is turned on.

Thus, the image of the film 4 is guided into an ordinary phototaking optical system (not shown) of the camera body. The recording of said image can be achieved by turning on the switch 14 provided on the film adaptor 3.

Also, the image recorded on a recording medium in the camera body can be erased by turning on the switch 15.

There are further shown a recording trigger switch 108, and a mode selector switch 109, both provided on the camera body.

Now, reference is made to FIG. 1, for explaining the internal circuits of the present embodiment. In FIG. 1, a broken-lined frame 1 indicates the camera body; a broken-lined frame 2 indicates the power supply coupler; a broken-lined frame 3 indicates the film adaptor; and a broken-lined frame 7 indicates the interface adaptor.

In the film adaptor 3, there are provided a REC switch 14 for triggering the recording operation; an ERASE switch 15 for triggering the erasing operation; an N/P switch 16 for selecting a positive or negative image; a power switch 6 for an illumination lamp 5; a BLON (back light on) switch 36 linked with said power switch 6; and an illumination lamp 5.

In the camera body there are provided a recording trigger button 108, a mode selector button 109; and a power switch 110 for the camera body.

In the interface adaptor 7, signal lines in the cable 8 from the film adaptor are connected by a connector 11, and are further guided into the cable 9 leading to the camera body. The video output terminal 12 releases a video signal obtained by mixing a Y+S signal and a chroma signal from the cable 9 in a mixing circuit 701.

In the power supply coupler 2, a sensor 21 receives the infrared light from a wireless remote control unit. A one-chip microcomputer 22, composed for example of an NEC μPD7564, is provided with a serial communication port which can select the functions of an ordinary output port and a communication port. A regulator 23, for supplying power to the microcomputer is controlled by a control signal CPUON 28 from the camera body 1. When said CPUON signal is shifted to the low level state, the regulator 23 is enabled to activate the microcomputer 23. A microcomputer 101 of the camera body shifts said control signal CPUON to the low level state when the power switch 110 is turned on.

The microcomputer 22, receiving signals from the switches 14, 15, 16, 36 of the film adaptor, can detect the state of these switches.

Based on a sensor output signal 24, the microcomputer 22 detects the remote control modes, for example from the frequency of said signal.

Signal lines 25–27 are provided for serial communication between the camera body and the microcomputer 22 in the power supply coupler 2.

In the camera body 1, there are provided a microcomputer 101 for controlling the camera body; a serial-parallel converter 102 for converting the serial communication data from the microcomputer 22 of the power supply coupler into parallel data, thereby enabling data communication with said microcomputer 101; and regulators 103, 104 for supplying the microcomputer 101 with a stable voltage.

The regulator 103 is provided for high speed operation of the microcomputer while the regulator 104 is provided for a low power consumption mode of the microcomputer, with a higher output voltage in the regulator 103 than in 104. Said microcomputer, composed for example of a Mitsubishi M37410, has a standby mode of a lower power consumption and a high-speed operation mode with a higher power consumption. A voltage selector switch 105 selects the power supply voltage for the microcomputer 101 according to necessity.

A record/reproducing block 106 of the still video camera is provided therein with a recording medium such as a magnetic disk or a semiconductor memory, and is capable of data recording into or data reproduction from said recording medium. In the following description, a video floppy disk having concentric recording tracks is taken as the example of said recording medium, but the present invention is not limited by such a recording medium. The image signal reproduced from such a medium is released in the state of a Y+S signal and a C (chroma) signal.

A character generator 107 is provided for displaying characters on an unrepresented monitor tube.

In the case of film image recording, the camera body is mounted on the film adaptor as shown in FIG. 3, and the film 4 is set therein.

Thus, the image on the film 4 is focused on an image pickup device in the camera body, through a phototaking optical system (not shown) of the camera body. In this state the lamp 5 is turned on by the switch 6 of the film adaptor 3.

The microcomputer 101 of the camera body 1 maintains the control signal CPUON 28 at the low level state, whereby the regulator 23 in the power supply coupler is enabled to activate the microcomputer 22. In this state said microcomputer 22 detects the state of the switches 301–304 of the film adaptor, and serially transfers corresponding code data to the serial-parallel converter 102 in the camera body.

The microcomputer 101 of the camera body fetches the data from said converter 102 and accordingly controls the camera body.

In the present embodiment, the serial data transferred between the microcomputer 22 and the serial-parallel converter 102 are assumed to be of 8 bits, from 00(H) to FF(H) in hexadecimal presentation.

Among these data, F0(H) to FF(H) for example are used as commands for indicating the states of the switches of the film adaptor. Among these 16 commands, a 0th bit is for example used for indicating the state of the REC switch 14 by "0" or "1" respectively for the on or off state; a 1st bit for the state of the ERASE switch 15 by "0" or "1" respectively for the on or off state; a 2nd bit for the state of the N/P switch 16 by "0" or "1" respectively for the on or off state; and a 3rd bit for the state of the BLON switch 36 by "0" or "1" respectively for the on or off state. Consequently, if the BLON switch 36 and the REC switch 14 are on while the ERASE switch 15 and the N/P switch 16 are off, the corresponding command code becomes F6(H).

The above-explained operations will be explained in the following, with reference to a flow chart shown in FIG. 2.

The sequence is started when the power switch 110 is turned on. A step S1 discriminates the state of the mode switch 109, and, if it is "on", indicating the recording mode, a step S2 sets a flag. If it is "off" indicating the reproducing mode, a step S3 clears the flag and the sequence proceeds to a step S4.

The step S4 discriminates whether new data are ready in the serial-parallel converter 102.

If the data are ready, a step S5 fetches said data, and a step S6 discriminates whether the upper 4 bits are all "1" (F), namely whether the data are a command of the film adaptor. In the present embodiment, the remote control mode is selected if the upper 4 bits of the data fetched in the data ready state are all "1". If said upper 4 bits are all "1", indicating a film adaptor command, a step S7 discriminates whether the flag has been set, and, if the flag is in the set state, indicating the recording mode, a step S8 executes a film adaptor sequence. On the other hand, if the flag is in the non-set state, indicating the reproducing mode, a step S9 executes a reproducing sequence.

If the step S6 identifies that the data are not a film adaptor command, a step S10 discriminates whether the flag has been set, and, if set, a step S12 executes the recording sequence, but if not set, a step S11 executes a remote control sequence.

The reproducing sequence is to reproduce the already recorded signals. For example, in case of a still video camera, it is to reproduce the recorded signals by a head access to an arbitrary track by suitable switching operations.

The remote control sequence is an operation additionally involving control by the wireless remote control unit, and is for example to gain access to the tracks by said remote control unit.

The recording sequence is to regulate the exposure, on an image obtained through the phototaking optical system of the camera body, for example by a shutter, and to record said image on a video floppy disk by modulating signals obtained for example from a CCD.

The film adaptor sequence is to record an optical image of the film, with eventual inversion of color and/or luminance by suitable operations of the switches of the film adaptor, or to erase the thus recorded image. This sequence will be explained later.

After the sequence execution in the step S8, S9, S11 or S12, the operation flow returns to a point (A).

If the step S4 identifies that the data are not ready, a step S13 discriminates whether the flag has been set, and, if not (reproducing mode), the sequence proceeds to a point (B), but, if set (recording mode), the step S12 executes the recording sequence.

In the following, details of the film adaptor sequence will be explained with reference to FIG. 4.

Figure 4B:
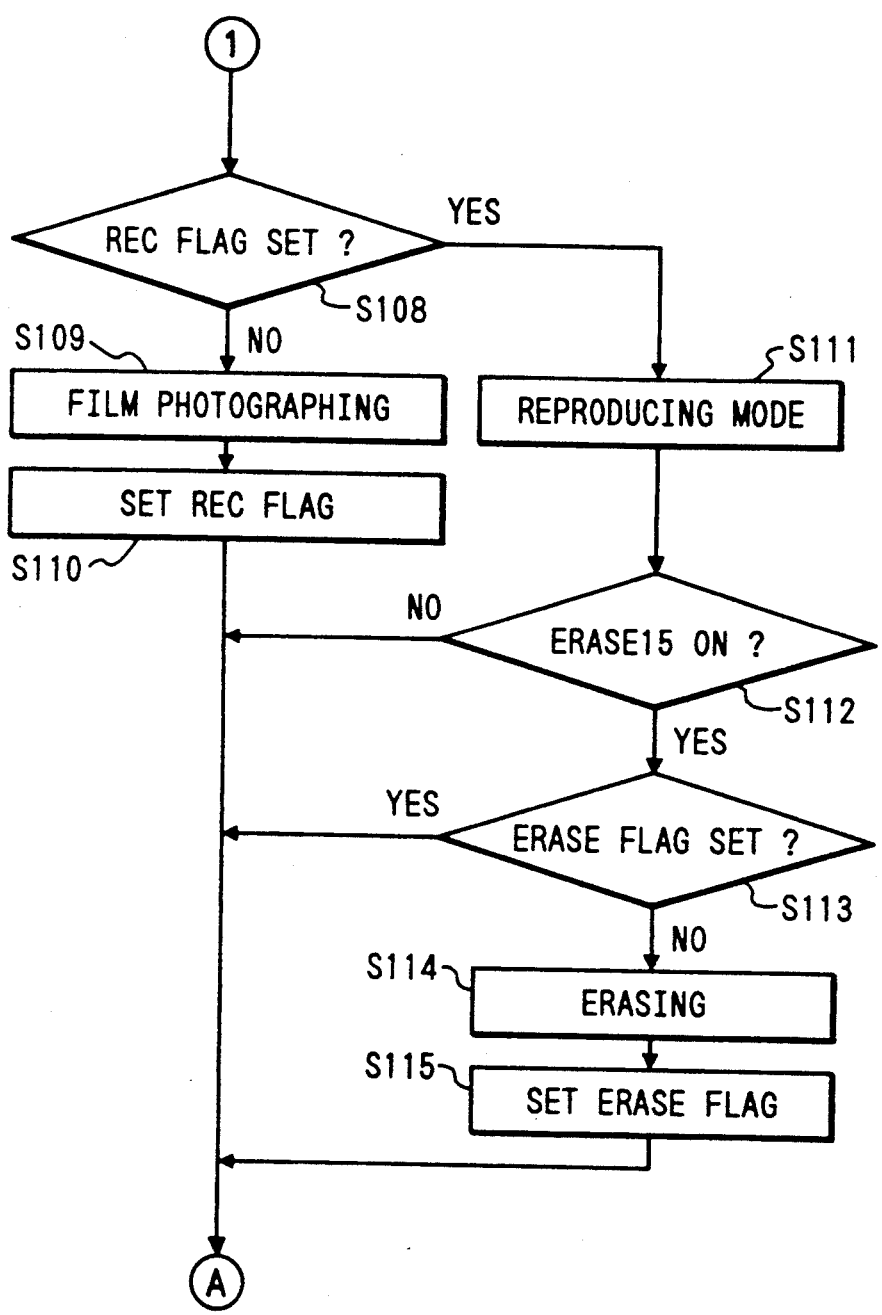

Referring to FIG. 4, at first a step S103 discriminates whether the BLON switch 36 is on.

If it is on, a step S104 discriminates whether the N/P switch 16 is set for a negative image or a positive image.

If it is set for a negative image, a step S105 sets the recording mode of the camera at the negative/positive inversion mode (negative mode). In said mode, the level of the signal obtained in the image pickup device is inverted, and the thus inverted signal is recorded. If such a negative mode is not selected, a step S106 sets the recording mode of the camera at a negative/positive non-inversion mode (positive mode).

Then, if a step S107 identifies that the REC switch 14 is on and if a step S108 identifies that the REC flag is not set, a step S109 records the film image, then a step S110 sets the REC flag, and the sequence returns to the point (A).

On the other hand, if the step S108 identifies that the REC flag has been set, indicating that the film image recording has already been conducted, a step S111 sets the camera at the reproducing mode, for example by turning on the power supply to the reproducing system, in order to reproduce the recorded image.

Then, if a step S112 identifies that the ERASE switch 15 is on, and if a step S113 identifies that the ERASE flag has not been set, a step S114 erases the image in a reproduced state.

Then, in a step S115, the microcomputer 101 sets the ERASE flag, and the sequence returns to the point (A) in FIG. 2.

If the step S112 identifies that the ERASE switch 15 is off, or if the step S113 identifies that the ERASE flag has been set, the erasure is not required and the sequence returns to the point (A) in FIG. 2.

On the other hand, if the step S107 identifies that the REC switch 14 is off, the sequence proceeds to steps S116, S117, and if these steps identify that the REC flag has been set and that the ERASE flag has not been set, the film image recording has already been conducted and the REC switch 14 has been turned off. Thus, as the recording track on which the recording head is positioned is already recorded, a step S118 shifts the recording head to a next track position, and the sequence proceeds to the point (B).

If the steps S116, S117 identify that the REC flag is not set but the ERASE flag has been set, the sequence proceeds to the step S119 without executing the step S118, since the recording can be conducted in the current track.

The step S119 clears the REC flag, then a step S120 clears the ERASE flag, and the sequence returns to (A).

In case the step S103 identifies that the BLON switch 36 is off, the sequence proceeds to a step S121.

The step S121 discriminates the state of the recording trigger switch 108 of the camera body, and, if it is on, a step S122 executes the normal phototaking sequence. Then the sequence proceeds to (B).

If said switch 108 is off, the sequence proceeds to (B). Said normal phototaking sequence is to record the image of an ordinary object instead of the film image, and such sequence will not be explained further.

Also, the reproducing mode in the step S111 will not be explained as it is the same as the reproducing operation in the usual still video camera.

In the above-explained operation sequence shown in FIG. 4, the image on the film can be recorded by turning on the REC switch 14 in the film image recording mode. The recorded image is reproduced for confirmation by maintaining the REC switch in the "on" state, and said image can be erased, if it is considered unnecessary, by turning on the ERASE switch 15.

In case of such erasure, a new image can be recorded on the same track since the recording head is not shifted to the next track.

In the film image recording mode in the above-explained sequence, the reproducing mode is maintained by repeating the steps S107, S108, S111, S112 and the return of the sequence to the point (A) as long as the REC switch 14 remains turned on, regardless of the recording mode selected in the camera body, such as the continuous or interval recording mode. Consequently, it is not necessary to alter the recording mode set in the camera body, and improved convenience of such is attained.

As explained in the foregoing, the present embodiment provides advantages of reducing erroneous operations such as overlapped recording during image reproduction, by limiting the modes of the film adaptor from the camera body.

In said embodiment, a film adaptor command or a remote control command is identified whether the upper 4 bits in the 8-bit data are all "1", but said data are naturally not limited to 8 bits. Also instead of the signals F0(H)-FF(H), there may be employed for example 80(H)-FF(H) according to the states of the switches.

Furthermore, the remote control operation need not be limited to the image reproduction but may also include, for example, image erasure and image editing.

Also in the present embodiment, an independent switch is provided for the image erasure, but another switch, for example the BLON switch for on/off control of illumination, may be used for this purpose.

In this case, the recording and reproduction are conducted by the REC button, and the erasure is conducted by turning off the illumination switch.

Also in the present embodiment, the auxiliary recording adaptor is designed to illuminate the film, but it may be any adaptor for assisting the recording operation, such as a close-up unit.

Also in the present embodiment, the microcomputer 101 in the camera body 1 disregards the commands sent from the adaptor in the reproducing mode, but such judgment may be conducted by the microcomputer 22 in the adaptor 2. This can be achieved by executing the flow in FIG. 2 by means of the microcomputer 22.

Second Embodiment

Figure 5:
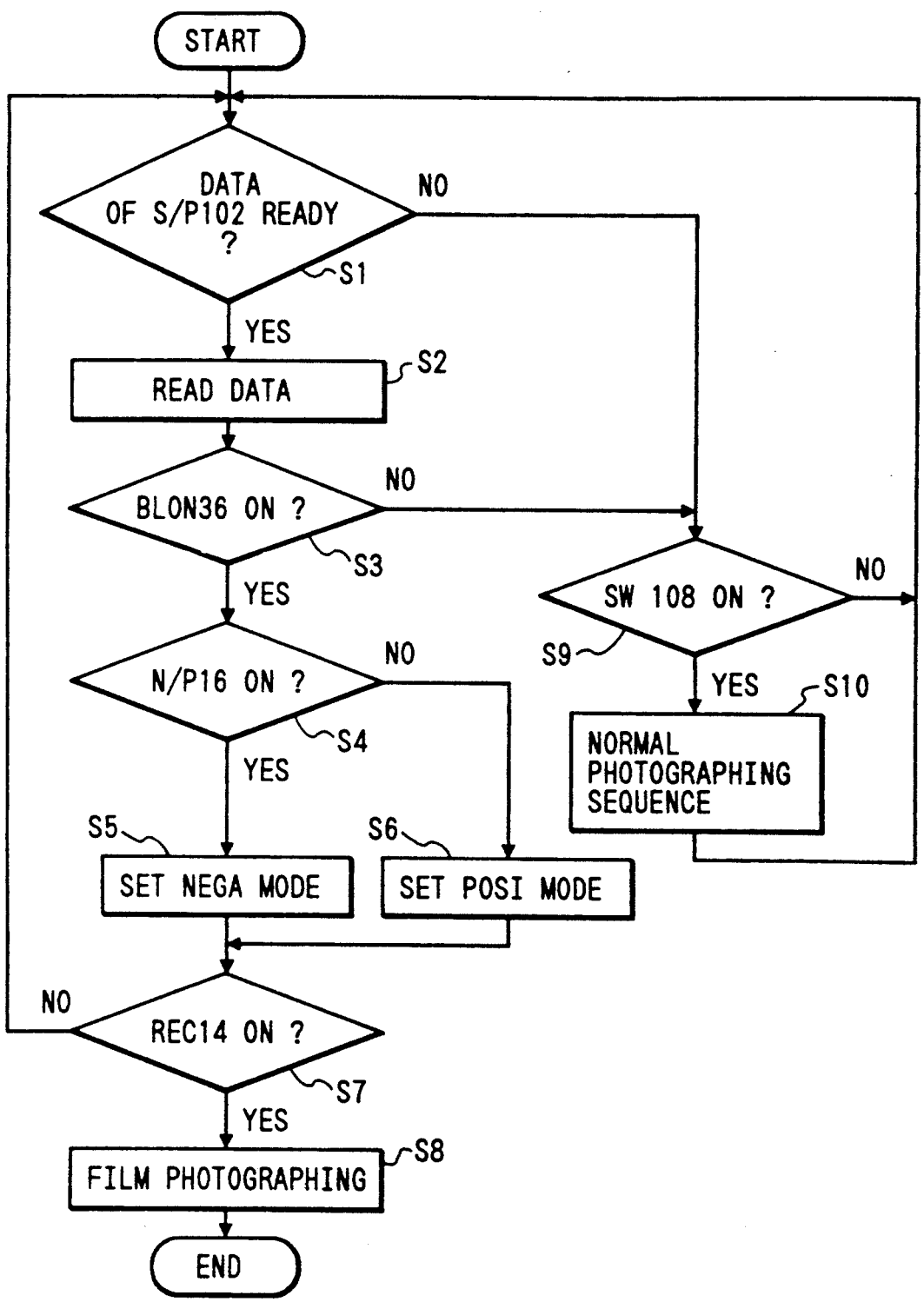
FIG. 5 is a flow chart of the operation sequence of a second embodiment of the present invention.

In the following there will be explained another embodiment of the present invention, with reference to a flow chart shown in FIG. 5.

At first, a step S1 discriminates whether new data are ready in the serial-parallel converter 102, and, if ready, a step S2 fetches said data.

A step S3 discriminates, based on the data fetched in the step S2, whether the BLON switch 36 is on, and, if on, a step S4 discriminates whether the N/P switch 16 is set at the negative or positive image. If set at the negative, a step S5 sets the recording mode of the camera at the negative/positive inversion mode (negative mode), but, if set at the positive, a step S6 sets said recording mode at the non-inversion mode (positive mode).

Then, if a step S7 identifies that the recording trigger switch 14 is on, a step S8 records the film image and the sequence is terminated. If the trigger switch 14 is off, the sequence returns to the step S1. If the data are not ready in the step S1 or the BLON switch 36 is off in the step S3, a step S9 discriminates the state of the recording trigger switch 108 of the camera body, and, if it is on, a step S10 executes the normal phototaking sequence. This sequence will not be explained further as it is for photographing an ordinary object instead of the film image. If the step S9 identifies that the switch 108 is off, the sequence returns to the step S1.

Thus, when the BLON switch 36 is on, namely in the film image recording mode, the recording trigger switch of the camera body is disregarded, and the recording by the switch 14 of the film adaptor alone is enabled.

In case the BLON switch 36 is off, namely in case the film image recording mode is not selected, the recording trigger switch of the film adaptor is disregarded, and the recording by the switch 108 of the camera body alone is enabled.

Third Embodiment

Figure 6:
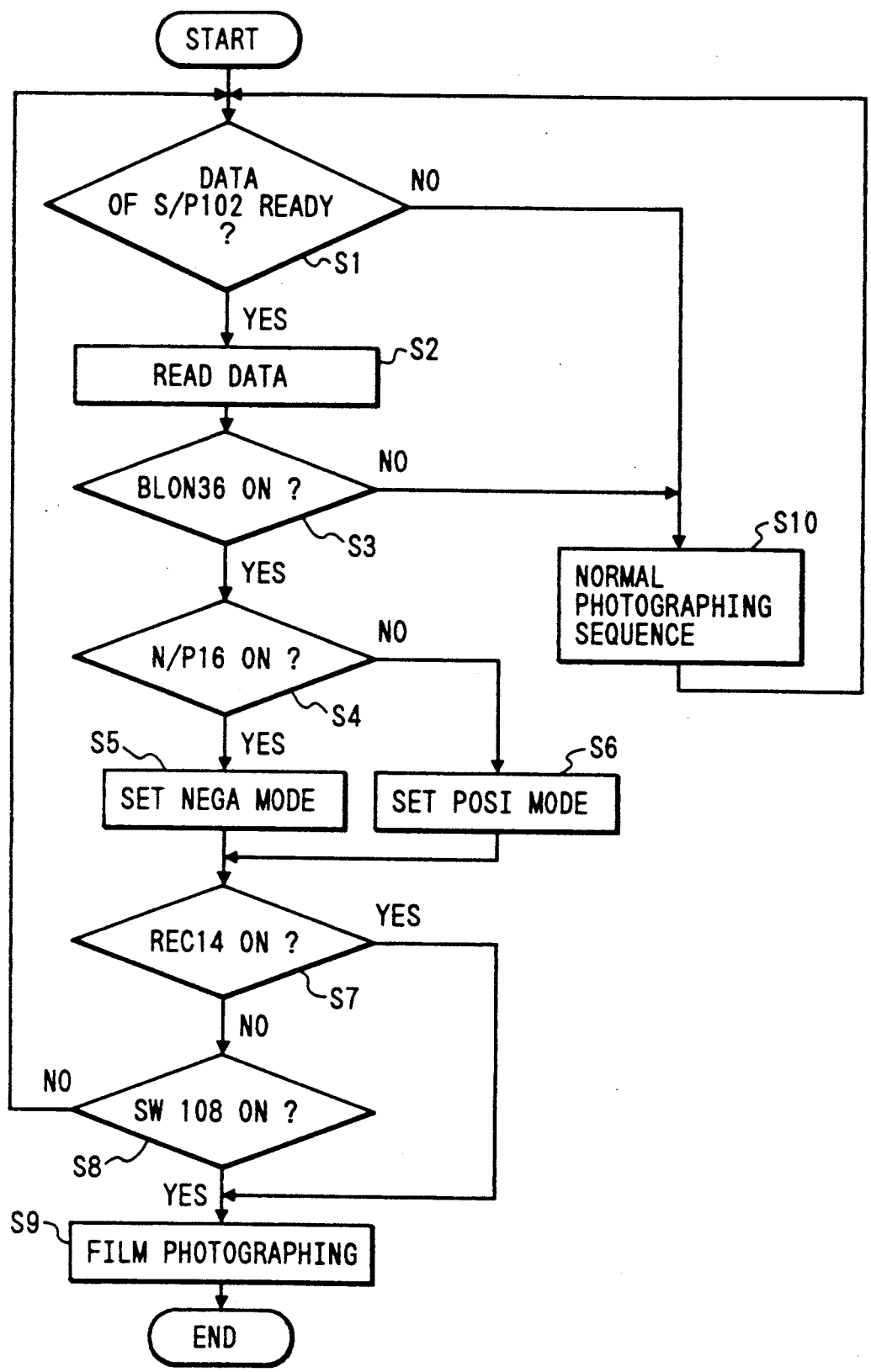
FIG. 6 is a flow chart of the operation sequence of a modification of the second embodiment of the present invention.

In the following there will be explained, with reference to FIG. 6, a variation of the flow chart shown in FIG. 5.

At first a step S1 discriminates whether new data are ready in the serial-parallel converter 102, and, if ready, a step S2 fetches said data. A step S3 discriminates, based on the data obtained in the step S2, whether the BLON switch 36 is on. If it is on, a step S4 discriminates whether the N/P switch 16 is set at negative or positive image mode, and, if negative, a step S5 sets the recording mode of the camera at the negative/positive inversion mode (negative mode). If positive, a step S6 sets said recording mode at the non-inversion mode (positive mode).

Then, if steps S7, S8 identify that either of the switches 14, 108 is turned on, a step S9 records the film image and the sequence is terminated.

If both switches are off, the sequence returns to the step S1. If the data are not ready in the step S1 or if the BLON switch 36 is off in the step S3, a step S10 executes the normal phototaking sequence.

This sequence will not be explained further, as it is for recording an ordinary object instead of a film image.

In the foregoing embodiments, the illumination switch of the film adaptor is mechanically linked with the switch for the film image recording mode, but these switches may be linked for example through a relay.

More specifically, it is also possible to detect the on/off state of said mode switch by the microcomputer as in FIG. 1 and to send the output of said mode switch to a relay for controlling the illumination.

Also, in the foregoing embodiments the illumination in the film adaptor is turned on and off by a switch, but the present invention is effective also in the case where the illumination is turned on by the connection of the cable 8 to the interface adaptor 7. This is equivalent to the continuous on-state of the switches 6 and 36, so that said switches may be shortcircuited and dispensed with. In this manner the microcomputer 22 can detect the connected state of the cable 8 and the activation of illumination.

Also, in the foregoing embodiments the data line is utilized for transmitting the signal for shifting the microcomputer of the camera body from the stand-by state to the enabled state, but the clock line required for communication may also be used for this purpose.

Also, the communication may be conducted bidirectionally, instead of monodirectional communication from the microcomputer of the power supply coupler to the camera body.

Also, the method of communication may be the asynchronous type, instead of the clock synchronous type employed in the foregoing embodiments.

Also, in the foregoing embodiments a serial-parallel converter is provided in the camera body, but there may be employed direct serial communication between the microcomputer in the camera body and that in the power supply coupler. Also in the foregoing embodiments, the film image recording mode is set by a switch of the film adaptor, and the switch for recording is selected according to the setting of said mode. Stated otherwise, one of the recording trigger switches is selected according to the setting or non-setting of the film image recording mode. The method setting of the film image recording mode is not limited to that described in the foregoing embodiments, but may be achieved also by a switch provided in the camera body or by the remote control unit, and the present invention is effective regardless of said method.

In case the recording trigger switch employed in the foregoing embodiments is used also for other functions, said other functions may or may not be restricted by the setting of said film image recording mode.

In the foregoing embodiments, an independent switch is provided for image erasure, but another switch, for example, the switch for on/off control of the illumination, may be used for this purpose.

In this case, the recording and reproduction are achieved by the REC button, and the erasure is achieved by turning off the illumination switch.

As explained in the foregoing, confirmation of the recorded image can be achieved promptly as the image is reproduced immediately after recording, and the image, if identified as unnecessary, can be erased by a switch operation. In addition, the image recording is enabled immediately thereafter. Thus, the convenience of operation is significantly improved.

Also, erroneous erasure of other images can be prevented since the image erasure is possible only immediately after the recording.

Besides, the presence of a trigger switch for the film image recording mode on the film adaptor improves the operability when the camera body is mounted on the film adaptor.

Furthermore, there is prevented an error of recording an inverted image, by actuating the trigger button of the camera body in the film image recording mode.

Furthermore, the operation in the film image recording mode is made extremely simple, by linking the on/off control of illumination of the film adaptor with the on/off control of the film image recording mode. In this manner it is easy to prevent the mistakes resulting from failure in turning on the illumination or from failure in setting the film image recording mode, so that the film image recording can be conducted with reduced possibility of mistakes.

Furthermore, the number of switches is reduced in the camera body and in the film adaptor, whereby cost reduction and compactization of equipment are rendered possible.

As explained in the foregoing, there can be prevented the drawbacks of erroneous erasure of the recorded image during reproduction and erroneous overlapped recording.

It is to be understood that the present invention is subject to various modifications within the scope and spirit of the appended claims.

What is claimed is:

1. An image recording system comprising:
an auxiliary adaptor for recording an image and having a manipulation section for generating an instruction signal;
a recording and reproducing apparatus to be used together with said auxiliary adaptor, wherein said recording and reproducing apparatus includes means for receiving said instruction signal corresponding to the manipulation of said manipulation section of said auxiliary adaptor, and means for controlling a state of said recording and reproducing apparatus according to said instruction signal received by said means for receiving; and
means for disregarding said instruction signal corresponding to the manipulation of said manipulation section when said recording and reproducing apparatus is in a reproducing mode.

2. A system according to claim 1, wherein
said auxiliary adaptor and said recording and reproducing apparatus are removably coupled together.

3. A system according to claim 1, wherein
said auxiliary adaptor comprises an optical adaptor.

4. A system according to claim 1, wherein
said instruction signal comprises a recording trigger signal.

5. A system according to claim 4,
further comprising control means for controlling said recording and reproducing apparatus so as to conduct recording according to the recording trigger signal.

6. A recording and reproducing apparatus to which an auxiliary adaptor having a manipulation section can be removably mounted, comprising:
means for switching said recording and reproducing apparatus between a recording mode and a reproducing mode; and
means for disregarding an instruction from the manipulation section of said auxiliary adaptor when said recording and reproducing apparatus is in the reproducing mode.

7. An apparatus according to claim 6, wherein
the instruction from the manipulation section comprises a recording signal.

8. An apparatus according to claim 6, wherein
said means for switching switches between the recording mode and the reproducing mode in response to a manual manipulation.

9. An auxiliary recording adaptor which can be removably mounted on a recording and reproducing apparatus, said recording and reproducing apparatus including means for receiving an instruction signal from an external source, and means for disregarding said instruction signal when said recording and reproducing apparatus is in a reproducing mode, said adaptor comprising:
a manipulation section for generating an instruction signal; and
means for transmitting the instruction signal to said recording and reproducing apparatus.

10. An adaptor according to claim 9, wherein
the instruction signal from the manipulation section comprises a recording trigger signal.

11. An adaptor according to claim 9, further comprising an optical system coupled to said recording and reproducing apparatus.

12. An image recording system comprising:
a recording apparatus for recording an object image on a recording medium; and
an adaptor detachably coupled to said recording apparatus, said adaptor including (i) an optical system for guiding an object image to said recording apparatus as an optical image, and (ii) a manipulation section for generating a recording trigger signal to cause said recording apparatus to perform a recording operation.

13. A system according to claim 12, wherein
the object image comprises a film image.

14. A system according to claim 12, wherein said recording apparatus includes:

a converter for converting the object image into an electrical image signal; and means for recording the electrical image signal on the recording medium.

15. A system according to claim 12, wherein said image signal comprises an electrical object image, and further comprising means for converting a received optical image into the electrical image signal, and wherein said apparatus includes apparatus for recording the electrical image signal on the recording medium after said optical image is converted into the electrical image signal, and wherein said recording trigger signal comprises a signal which commands said converting means to convert said optical image into the electrical image signal.

16. An adaptor for use with a recording apparatus for recording an object image on a recording medium, comprising:

an optical system for guiding the object image into said recording apparatus as an optical image; and a manipulation section for activating an operation of said recording apparatus.

17. An adaptor to claim 16, further comprising a light emitting means for illuminating the object image.

18. An apparatus according to claim 16, wherein said manipulation section issues a recording trigger signal to activate said operation of said recording apparatus.

19. An adaptor according to claim 16, wherein said manipulation section provides a trigger signal to activate the operation of said recording apparatus, wherein said object image comprises an electrical image signal, and further comprising means for converting a received optical image into the electrical image signal, wherein said recording apparatus includes apparatus for recording the electrical image signal on the recording medium after said optical image is converted into the electrical image signal, and wherein said trigger signal comprises a signal which commands said converting means to convert the optical image into the electrical image signal.

20. A control device for use in an apparatus for (i) recording an image signal on a recording medium, (ii) reproducing the recorded image signal from the recording medium, and (iii) erasing the image signal from the recording medium, comprising:

a first manipulation member distinct from said first manipulation member; and control means for controlling said apparatus to cause (i) the recording of the image signal to be conducted according to a manipulation of said first manipulation member, (ii) a reproducing of the recorded image signal to be conducted when an operational state of the first manipulation member is maintained for a predetermined period of time, and (iii) the reproduced image signal to be erased according to a manipulation of the second manipulation member in a reproducing mode.

21. A control device according to claim 20, wherein said second manipulation member comprises an erase member.

22. A photographic system comprising:

a camera having a plurality of operation buttons; and a film photographing device on which said camera and an object to be photographed are mounted so as to oppose each other, said device having a light source for illuminating the object, and a plurality of operational buttons corresponding to said plurality of operation buttons of said camera, wherein, when said camera is attached to said device so as to perform a photographing operation, operation of said camera operation buttons is inhibited and the plurality of device operational buttons are enabled to operate the camera.

* * * * *

UNITED STATES PATENT AND TRADEMARK OFFICE
CERTIFICATE OF CORRECTION

PATENT NO. : 5,317,404
DATED : May 31, 1994
INVENTOR(S) : Nobuo FUKUSHIMA, et al.

It is certified that error appears in the above-indentified patent and that said Letters Patent is hereby corrected as shown below:

COLUMN 3:
    Line 5, "In" should read --In the--.

COLUMN 9:
    Line 3, "setting of" should read --of setting--.

COLUMN 11:
    Line 23, "adaptor" should read --adaptor according--.

COLUMN 12:
    Line 9, "distinct from said first" should read --for generating a recording trigger signal;--;
    Line 10, "manipulation" should read as a new paragraph --a second manipulation member distinct from said first manipulation--; and
    Line 11, "apparatus" should read --apparatus,--.

Signed and Sealed this

Twenty-seventh Day of December, 1994

Attest:

BRUCE LEHMAN

*Attesting Officer*     *Commissioner of Patents and Trademarks*